(12) United States Patent
Chen

(10) Patent No.: US 7,792,913 B2
(45) Date of Patent: Sep. 7, 2010

(54) PROVIDING MULTI-DEVICE INSTANT MESSAGING PRESENCE INDICATIONS

(75) Inventor: Jing Chen, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 445 days.

(21) Appl. No.: 11/856,163

(22) Filed: Sep. 17, 2007

(65) Prior Publication Data

US 2009/0077181 A1    Mar. 19, 2009

(51) Int. Cl.
G06F 15/16    (2006.01)

(52) U.S. Cl. ........................ 709/206; 709/202; 709/203; 709/204; 709/205; 709/207; 709/223; 709/224; 709/227; 709/228; 709/229; 709/230; 709/246; 455/443; 455/466

(58) Field of Classification Search ......... 709/202–207, 709/223–224, 227–230, 246; 455/412.1, 455/443, 466
See application file for complete search history.

(56) References Cited

U.S. PATENT DOCUMENTS

| | | | |
|---|---|---|---|
| 6,658,095 B1* | 12/2003 | Yoakum et al. | 379/93.01 |
| 6,668,167 B2* | 12/2003 | McDowell et al. | 455/412.1 |
| 6,750,881 B1* | 6/2004 | Appelman | 715/733 |
| 7,001,023 B2 | 2/2006 | Lee et al. | |
| 7,035,923 B1* | 4/2006 | Yoakum et al. | 709/224 |
| 7,227,937 B1* | 6/2007 | Yoakum et al. | 379/201.01 |
| 7,356,567 B2* | 4/2008 | Odell et al. | 709/206 |
| 7,487,248 B2* | 2/2009 | Moran et al. | 709/227 |
| 7,543,034 B2* | 6/2009 | Deshpande | 709/207 |
| 7,607,096 B2* | 10/2009 | Oreizy et al. | 715/751 |
| 2001/0034224 A1* | 10/2001 | McDowell et al. | 455/412 |
| 2003/0208545 A1* | 11/2003 | Eaton et al. | 709/206 |
| 2004/0158609 A1* | 8/2004 | Daniell et al. | 709/206 |
| 2006/0288077 A1 | 12/2006 | Chen | |
| 2007/0016878 A1 | 1/2007 | Forlenza et al. | |
| 2007/0083675 A1 | 4/2007 | Vemulapelli et al. | |
| 2007/0130259 A1* | 6/2007 | Daniell et al. | 709/204 |

* cited by examiner

*Primary Examiner*—Jinsong Hu
(74) *Attorney, Agent, or Firm*—Cantor Colburn LLP

(57) ABSTRACT

Displaying an instant messaging (IM) presence indicator for each of a plurality of devices associated with a first user, wherein the plurality of devices include a first device representing a first type of instant messaging device and second device representing a second type of instant messaging device. Presence information is acquired for the first and second devices. A first device type identifier is associated with a first activation/deactivation flag indicative of whether or not the first device is activated to receive incoming instant messages, and a second device type identifier is associated with a second activation/deactivation flag indicative of whether or not the second device is activated to receive instant messages. The device type identifiers and activation/deactivation flags are transmitted to a third device associated with a second user for display on the third device.

17 Claims, 4 Drawing Sheets

PROVIDING MULTI-DEVICE INSTANT MESSAGING PRESENCE INDICATIONS

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

FIELD OF INVENTION

The present invention relates generally to instant messaging and, more specifically, to a multi-device instant messaging presence indicator for use with a plurality of different types of instant messaging devices.

BACKGROUND OF THE INVENTION

Instant messages are electronic messages sent from device to device within an instant messaging (IM) community. Each of the devices displays a sequence of incoming and outgoing messages, typically in the form of a textual dialogue representing a conversation. However, these messages may include voice, video, still images, or electronic files in addition to, or in lieu of, text. IM differs from e-mail in that IM conversations occur in real time. Whereas email is a correspondence-based form of communication, IM provides users with the reassurance and satisfaction of receiving immediate replies. Accordingly, IM has experienced wide popularity among users of all ages.

One feature commonly offered by IM service providers is that a user can set up a list of contacts including friends, family members, colleagues, and others. The contact list is referred to as a "buddy list", with each contact on the list known as a "buddy". A user who is a member of an instant messaging (IM) community has a unique identifier in that community and can be added to the contact list of another member of the community using that unique identifier. This identifier (ID) is sometimes referred to as a contact name or buddy name. For example, short messaging service (SMS) is a form of IM that is available within the community of mobile telephone users, wherein the telephone number assigned to a mobile telephone functions as the unique identifier.

Another feature commonly offered by IM service providers is presence awareness. This feature provides an indication to a user specifying whether or not each of the buddies in the user's contact list is currently online and available to chat. At present, IM users can implement instant messaging using any of a plurality of device types such as wireless telephones, laptop computers, personal digital assistants (PDAs), Internet Protocol television (IPTV)-capable devices, and others. These devices may be utilized in conjunction with any of a variety of different communication platforms, such as wireless telephony, IP-based communication, and others. Existing techniques for indicating presence awareness merely indicate that a desired message recipient is online and available to receive a message, but do not provide any indication as to the type of device available to the recipient. Illustratively, if a sender wished to send a message in the form of a video clip, such a message could be viewed if a recipient was using the IPTV-capable device, but not if the recipient was using a cellphone. Unfortunately, the instant message sender is unaware of the capabilities of the device that the recipient will use to receive the instant message.

SUMMARY OF THE INVENTION

Exemplary embodiments relate to methods, computer program products, and apparatuses for displaying an instant messaging (IM) presence indicator for each of a plurality of devices associated with a first user, wherein the plurality of devices include a first device representing a first type of instant messaging device and a second device representing a second type of instant messaging device different from the first type of instant messaging device. According to one set of exemplary embodiments, the methods include acquiring presence information for the first and second devices, associating a first device type identifier corresponding to the first type of instant messaging device with a first activation/deactivation flag indicative of whether or not the first device is activated to receive incoming instant messages based upon the presence information for the first device, and associating a second device type identifier corresponding to the second type of instant messaging device with a second activation/deactivation flag indicative of whether or not the second device is activated to receive instant messages based on the presence information for the second device. The first and second device type identifiers and first and second activation/deactivation flags are transmitted to a third device associated with a second user for display on the third device.

Another set of exemplary embodiments include computer program products for displaying an instant messaging (IM) presence indicator for each of a plurality of devices associated with a first user, wherein the plurality of devices include a first device representing a first type of instant messaging device and a second device representing a second type of instant messaging device different from the first type of instant messaging device. The computer program products include a storage medium readable by a processing circuit and storing instructions for execution by the processing circuit for facilitating a method. The method includes acquiring presence information for the first and second devices, associating a first device type identifier corresponding to the first type of instant messaging device with a first activation/deactivation flag indicative of whether or not the first device is activated to receive incoming instant messages based upon the presence information for the first device, and associating a second device type identifier corresponding to the second type of instant messaging device with a second activation/deactivation flag indicative of whether or not the second device is activated to receive instant messages based on the presence information for the second device. The first and second device type identifiers and first and second activation/deactivation flags are transmitted to a third device associated with a second user for display on the third device.

Another set of exemplary embodiments include apparatuses for displaying an instant messaging (IM) presence indicator for each of a plurality of devices associated with a first user, wherein the plurality of devices include a first device representing a first type of instant messaging device and a second device representing a second type of instant messaging device different from the first type of instant messaging device. The apparatuses include a processing mechanism for acquiring presence information for the first and second devices, associating a first device type identifier corresponding to the first type of instant messaging device with a first activation/deactivation flag indicative of whether or not the first device is activated to receive incoming instant messages based upon the presence information for the first device, and associating a second device type identifier corresponding to the second type of instant messaging device with a second activation/deactivation flag indicative of whether or not the second device is activated to receive instant messages based upon the presence information for the second device; a storage mechanism operatively coupled to the processing mechanism for storing at least a most recently acquired portion of the acquired presence information; and a communications mechanism for transmitting the first and second device type identifiers and first and second activation/deactivation flags to a third device associated with a second user for display on the third device.

Other methods, computer program products, and apparatuses according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF THE INVENTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
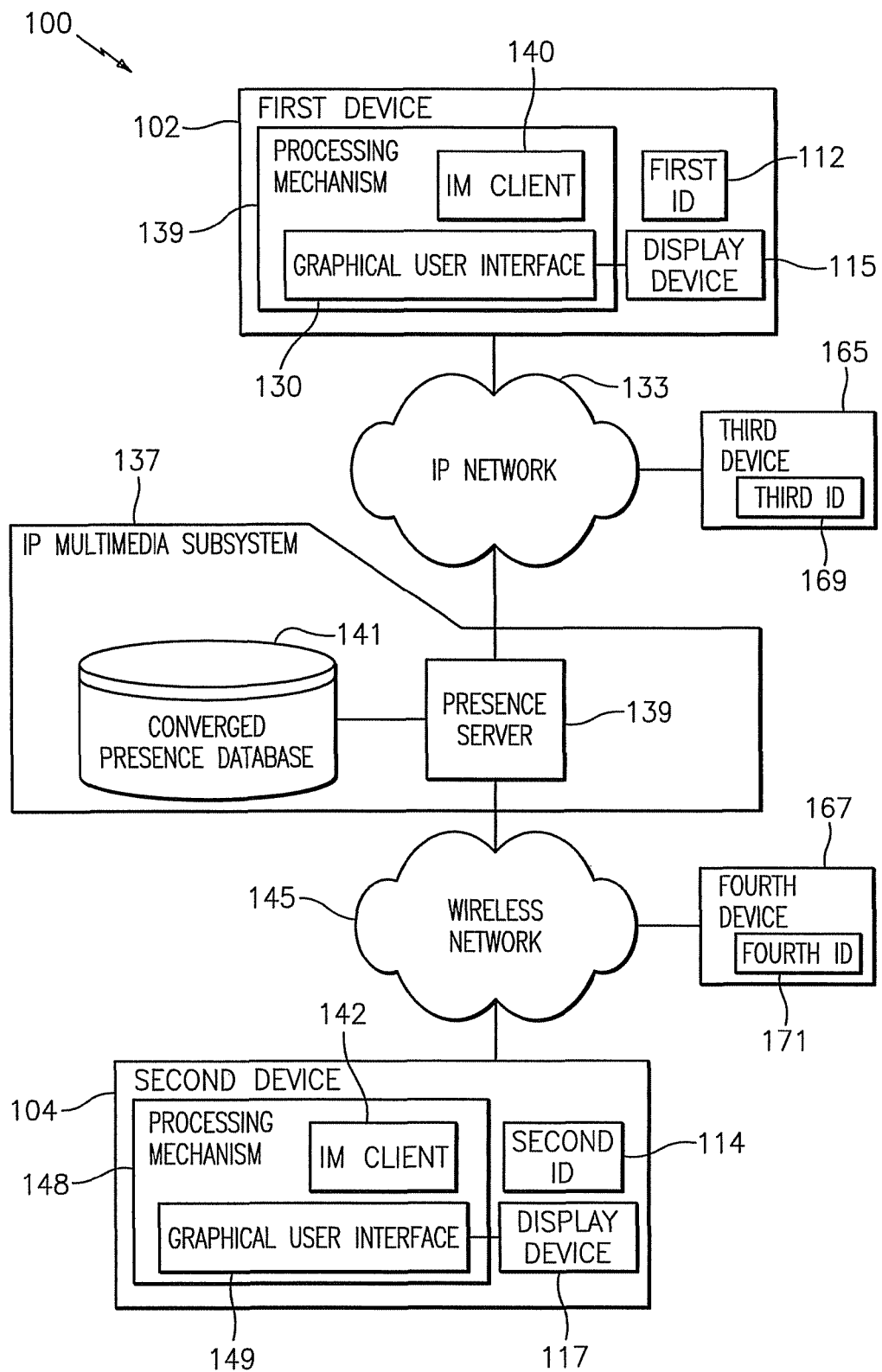
FIG. 1 is a simplified block diagram of an exemplary communication system used to acquire multi-device instant messaging (IM) presence information.

FIG. 1 is a simplified block diagram of an exemplary communication system 100 used to provide multi-device instant messaging (IM) presence indications. System 100 includes a plurality of devices, illustratively provided in the form of a first device 102, a second device 104, a third device 165 and a fourth device 167, although any number of two or more devices may be employed. First device 102 stores a first identifier (ID) 112 associated with a first user in an instant messaging community, and second device 104 stores a second identifier (ID) 114 associated with a second user in the instant messaging community. The instant messaging community may, but need not, be defined with respect to all devices that receive IM service from a particular service provider or group of service providers.

For illustrative purposes, third device 165 may, but need not, be substantially identical to first device 102, with the exception that third device 165 stores a third ID 169 associated with the second user. Accordingly, third ID 169 may, but need not, be substantially identical to second ID 114. If third ID 169 is not substantially identical to second ID 114, then third ID 169 represents another ID, in addition to second ID 114, that is associated with to the second user. Fourth device 167 may, but need not, be substantially identical to second device 104, with the exception that fourth device 167 stores a fourth ID 171 associated with the first user. Accordingly, fourth ID 171 may, but need not, be substantially identical to first ID 112. If fourth ID 171 is not substantially identical to first ID 112, then fourth ID 171 represents another ID, in addition to first ID 112, that is associated with the first user.

Prior to participating in the instant messaging community for the first time, the first user may, but need not, select at least one of first ID 112 or fourth ID 171, by entering a user-specified ID for the first user into at least one of first device 102 or fourth device 167. According to exemplary embodiments, if the user-specified ID is entered into first device 102, the user-specified ID is transmitted over an IP network 133 to an IP multimedia subsystem 137 for storage on a converged presence database 141. If the user-specified ID is entered into fourth device 167, the user-specified ID is transmitted over a wireless network 145 to IP multimedia subsystem 137 for storage on converged presence database 141. After the user-specified ID for the first user is stored on converged presence database 141, this user-specified ID, in the form of at least one of first ID 112 or fourth ID 171, becomes the first user's identifier for use throughout the instant messaging community.

Likewise, prior to participating in the instant messaging community for the first time, the second user may, but need not, select at least one of second ID 114 or third ID 169 by entering a user-specified ID for the second user into at least one of second device 104 or third device 165. If the user-specified ID is entered into second device 104, the user-specified ID is transmitted over wireless network 145 to IP multimedia subsystem 137 for storage on converged presence database 141. If the user-specified ID is entered into third device 165, the user-specified ID is transmitted over IP network 133 to IP multimedia subsystem 137 for storage on converged presence database 141. After the user-specified ID for the second user is stored on converged presence database 141, this user-specified ID, in the form of at least one of second ID 114 or third ID 169, becomes the second user's identifier for use throughout the instant messaging community.

As an alternative or addition to user-selected ID's, system 100 may automatically determine IDs for one or more users. For example, IP network 133 may automatically determine first ID 112 for the first user, with the determined first ID 112 being stored in converged presence database 141. Illustratively, IP network 133 determines first ID 112 for the first user by acquiring a device identifier for first device 102 in the form of an IP Multimedia Private Identity (IMPI) or an IP Multimedia Public Identity (IMPU) or both. IMPIs and IMPUs represent uniform resource identifiers (URIs) in the form of digits (a tel-uri, like tel:+1-555-123-4567) or alphanumeric identifiers (a sip-uri, like sip:john.doe@example.com), or both. The IMPI is unique to a specific device (i.e., a specific phone), but multiple IMPUs can be associated with a single IMPI. Moreover, IMPUs can be associated with device types that are not necessarily equipped for IP communication, such as mobile phones. The IMPU can also be shared with a plurality of devices (for example, a plurality of phones), so that any of a plurality of devices can be reached with the same identity (for example, a single phone number for an entire family).

Likewise, wireless network 145 may automatically determine second ID 114 for the second user, with the determined second ID 114 being stored in converged presence database 141. Illustratively, wireless network 145 determines second ID 114 for the second user by acquiring an International Mobile Subscriber Identity (IMSI), a Temporary Mobile Subscriber Identity (TMSI), an International Mobile Equipment Identity (IMEI), or a Mobile Subscriber ISDN Number (MSISDN), for second device 104. IMSI is a unique user identity that is stored in a subscriber identity module (SIM) of second device 104. To improve privacy, a TMSI can optionally be generated per geographical location. While IMSI/TMSI are used for user identification, the IMEI is a unique device identity and is phone specific. The MSISDN represents the telephone number of the second user.

First device 102 and third device 165 each represent a first type of instant messaging device. Second device 104 and fourth device 167 each represent a second type of instant messaging device different from the first type of instant messaging device. Therefore, for purposes of the present illustrative example, the first user is associated with a first type of instant messaging device (first device 102) as well as a second type of instant messaging device (fourth device 167). Likewise, the second user is also associated with a first type of instant messaging device (third device 165) as well as a second type of instant messaging device (second device 104).

Some illustrative types of instant messaging devices include, but are not limited to, wireless telephones, laptop computers, personal digital assistants (PDAs), Internet Protocol television (IPTV)-capable devices, and personal computers. These devices may be utilized in conjunction with any of a variety of different communication platforms, such as wireless telephony, IP-based communication, and others. Instant messaging devices could, but need not, be categorized into one or more device types in accordance with a communications platform used by the device. For example, an illustrative device referred to as "device A" could be classified as a first type of device if device A is capable of communicating over IP network 133. Another device, referred to as "device B", could be classified as a second type of device if device B is capable of communicating over wireless network 145. Alternatively or additionally, instant messaging devices could, but need not, be categorized into one or more device types based upon the suitability of the device for displaying different types of instant message content, such as text-based messages, video clips, still video images, electronic files, SMS messages, or others. For purposes of the present disclosure, any device that is capable of sending and receiving instant messages is an instant messaging device, irrespective of whether or not instant messaging is a primary intended purpose of that device.

For illustrative purposes, first device 102 as well as third device 165 may each represent any instant messaging device that is capable of communicating with IP network 133. Communications between first device 102 and IP network 133 may, but need not, take place using an Ethernet, digital subscriber loop (DSL) or cable connection. Pursuant to the present example, second device 104 and fourth device 167 each represent any instant messaging device that is capable of communicating over wireless network 145. Communications between second device 104 and wireless network 145 may, but need not, take place using any of a third-generation (3G), WiFi, or WiMax mobile access link, wideband code division multiple access (W-CDMA), CDMA2000, global system for mobile (GSM), general packet radio service (GPRS), wireless local area network (WLAN), other wireless protocol, or any of various combinations thereof.

A non-exhaustive list of device types or categories that first device 102 and third device 165 may represent include workstations, notebook computers, laptop computers, desktop personal computers, personal digital assistants (PDAs), handheld computers, electronic mail (Email) clients, media presentation devices capable of implementing internet protocol television (IPTV), programmable consumer electronics, networked PCs, and the like. First device 102 and third device 165 could, for example, be two different devices selected from the foregoing listing, or two of the same devices selected from the foregoing listing. A non-exhaustive list of device types or categories that second device 104 and fourth device 167 may represent include cellular telephones, smart cell phones, notebook computers, laptop computers, personal digital assistants (PDAs), hand-held computers, electronic mail (Email) clients, and the like.

A non-exhaustive list of examples for IP network 133 includes wired or optical networks such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof. IP network 133 may include any combination of additional communication devices (not shown) such as gateways, routers, switches, and the like.

A non-exhaustive list of examples for wireless network 145 includes networks such as Direct Sequence—Code Division Multiple Access (DS-CDMA), Global System for Mobile Communications (GSM), North American Digital Cellular (NADC), Time Division Multiple Access (TDMA), Extended-TDMA (E-TDMA), W-CDMA, GPRS, GSM, Enhanced Data for GSM Evolution (EDGE), 3G and 4G communication, wireless local area networks such as 802.11, Bluetooth™, Zigbee™, ultra wideband (UWB), or various combinations thereof. Wireless network 145 may include any combination of additional communication devices (not shown) such as gateways, routers, switches, and the like.

Wireless network 145 and IP network 133 are operatively coupled to IP multimedia subsystem (IMS) 137. Although FIG. 1 shows wireless network 145, IP network 133, and IMS 137 as separate elements, this is for illustrative purposes only. IMS 137 could, but need not, be implemented within IP network 133, or within wireless network 145, or both. According to exemplary embodiments, IMS 137 represents an architectural framework for integrating IP-based multimedia services and wireless services so as to provide for the exchange of instant messages between IP network 133 and wireless network 145. Illustratively, IMS 137 enables instant messaging to be performed across wireless and wireline terminals by providing a horizontal control layer that isolates an access network (such as IP network 133 and wireless network 145) from a service layer. Each service does not have to provide its own control functions as the control layer is used to provide a common horizontal layer across a plurality of services.

IMS 137 includes a presence server 139 operatively coupled to converged presence database 141. IMS 137 may implement a feature permitting a plurality of users, such as a first user identified by first ID 112 and a second user identified by second ID 114, to each specify a list of one or more contacts including friends, family members, colleagues, and others. A user, such as the first user, specifies these contacts by specifying IDs for one or more other users, such as second ID 114, that are to be incorporated into the list of contacts. For example, the first user may specify a contact by entering one or more IDs (such as second ID 114) into first device 102. According to exemplary embodiments, the entered one or more IDs are sent over IP network 133, received by IMS 137, and stored in converged presence database 141 as a contact list associated with first ID 112. This contact list, illustratively including second ID 114, represents a buddy list for the first user. Similarly, the second user may specify a contact by entering one or more IDs (such as first ID 112) into second device 104. In accordance with exemplary embodiments, the entered one or more IDs are sent over wireless network 145, received by IMS 137, and stored in converged presence database 141 as a contact list associated with second ID 114. This contact list, illustratively including first ID 112, represents a buddy list for the second user.

First device 102 includes a processing mechanism 139 that is capable of implementing an IM client 140 and a graphical user interface 130. Graphical user interface 130 is capable of driving a display device 115 equipped to display one or more instant messages including content in the form of at least one of text, video, or still images. Graphical user interface 130 is also capable of driving display device 115 to display presence indicators for one or more contacts or buddies included in a contact list or buddy list corresponding to the user of first device 102. Optionally, first device 102 includes a transducer for generating audible information from instant messages in the form of audio. Display device 115 may represent a single display device or, alternatively, two separate display devices may be provided, a first display device capable of displaying presence indicators, and a second display device capable of displaying instant message content.

Likewise, second device 104 includes a processing mechanism 148 that is capable of implementing an IM client 142 and a graphical user interface 149. Graphical user interface 149 is capable of driving a display device 117 equipped to display one or more instant messages including at least one of text, video, or still images. Graphical user interface 149 is also capable of driving display device 117 to display presence indicators for one or more contacts or buddies included in a contact list or buddy list corresponding to the user of second device 104. Optionally, second device 104 includes a transducer for generating audible information from instant messages in the form of audio. Display device 117 may represent a single display device or, alternatively, two separate display devices may be provided, a first display device capable of displaying presence indicators, and a second display device capable of displaying instant message content.

According to exemplary embodiments, IM client 140 is installed on processing mechanism 139, and IM client 142 is installed on processing mechanism 148. IM client 140 may be implemented in software, hardware, firmware or any combination thereof. Likewise, IM client 142 may be implemented in software, hardware, firmware or any combination thereof. IM clients 140 and 142 each provide an interface for a user to compose, send, receive, and read instant messages including at least one of text, still images, or video content. Illustrative examples for IM clients 140 and 142 include, but are not limited to, AT&T Messenger™, IBM's SameTime™, MSN Messenger™, and Yahoo/AOL Instant Messenger™.

In conjunction with graphical user interface 130 and display device 115, IM client 140 provides at least one, and typically several, windows through which a user can compose and read instant messages. IM client 140 may also provide a facility for managing a contact list or buddy list. Likewise, in conjunction with graphical user interface 149 and display device 117, IM client 142 provides at least one, and typically several, windows through which a user can compose and read instant messages. IM client 142 also provides a facility for managing a contact list or buddy list.

When the user of first device 102 sends an instant message to the user of second device 104, the instant message is handled by IM client 140, communicated to IP network 133, communicated to IP multimedia subsystem 137, and passed to wireless network 145 for communication to second device 104. When the user of second device 104 sends an instant message to the user of first device 102, the instant message is handled by IM client 142 on second device 104, communicated to wireless network 145, communicated to IP multimedia subsystem 137, and passed to IP network 133 for communication to first device 102.

IP multimedia subsystem 137 may identify a device used by a contact (such as first device 102 or second device 104) by using the unique device identifier for the device stored in converged presence database 141. IP multimedia subsystem 137 then enables the instant message to be addressed to the appropriate device. If the instant message cannot be delivered to the contact's device, IP multimedia subsystem 137 may store the instant message and attempt redelivery for a specified period of time, for example, 24 hours or 48 hours.

According to exemplary embodiments, presence server 139 acquires presence information from a plurality of devices and stores the presence information in converged presence database 141. Converged presence database 141 may, but need not, be capable of storing at least a most recently acquired portion of the acquired presence information. For example, presence information for a plurality of devices used by the first user may be acquired periodically, repeatedly, at regular intervals, at one or more predetermined times, or by monitoring an activation or a deactivation for any of the plurality of devices, or in response to detecting the activation or deactivation of any of the plurality of devices, with only the most recent or current presence information for each of the devices being stored in converged presence database 141. These devices may include, for example, a first type of instant messaging device such as first device 102 and a second type of instant messaging device such as third device 165. Presence server 139 associates a first device type identifier corresponding to the first type of instant messaging device with a first activation/deactivation flag indicative of whether or not first device 102 is activated to receive incoming instant messages. Presence server 139 also associates a second device type identifier corresponding to the second type of instant messaging device with a second activation/deactivation flag indicative of whether or not third device 165 is activated to receive instant messages.

The first and second device type identifiers and first and second activation/deactivation flags are transmitted to a device associated with a second user, such as second device 102 or fourth device 167, for display on one or more of second device 102 or fourth device 167. Alternatively or additionally, the first and second activation/deactivation flags may be indicative of whether or not the first user is presently available to respond to an incoming instant message on each of a plurality of different device types. According to exemplary embodiments, the first and second device type identifiers are each indicative of a device type or category associated with a device. For example, a device type identifier may be used to identify a device in terms of a category, such as a cellular telephone, a personal digital assistant (PDA), a personal computer, an IPTV-capable device, a laptop computer, or others. Additionally or alternatively, the device type identifier is actually a device identifier that uniquely identifies a specific physical device used by the user associated with the ID.

The acquired presence information may be used to generate a graphical representation of presence information for one or more user devices such as first device 102, second device 104, third device 165, or fourth device 167. If first device 102 is activated (i.e., powered on), presence server 139 retrieves presence information from converged presence database 141 for each of one or more IDs corresponding to contacts on the contact list associated with first ID 112, according to exemplary embodiments. The presence information may be transmitted over IP network 133, received by first device 102, and used by graphical user interface 130 to display presence indicators on display device 115 for each contact on the contact list associated with first ID 112.

Figure 3:
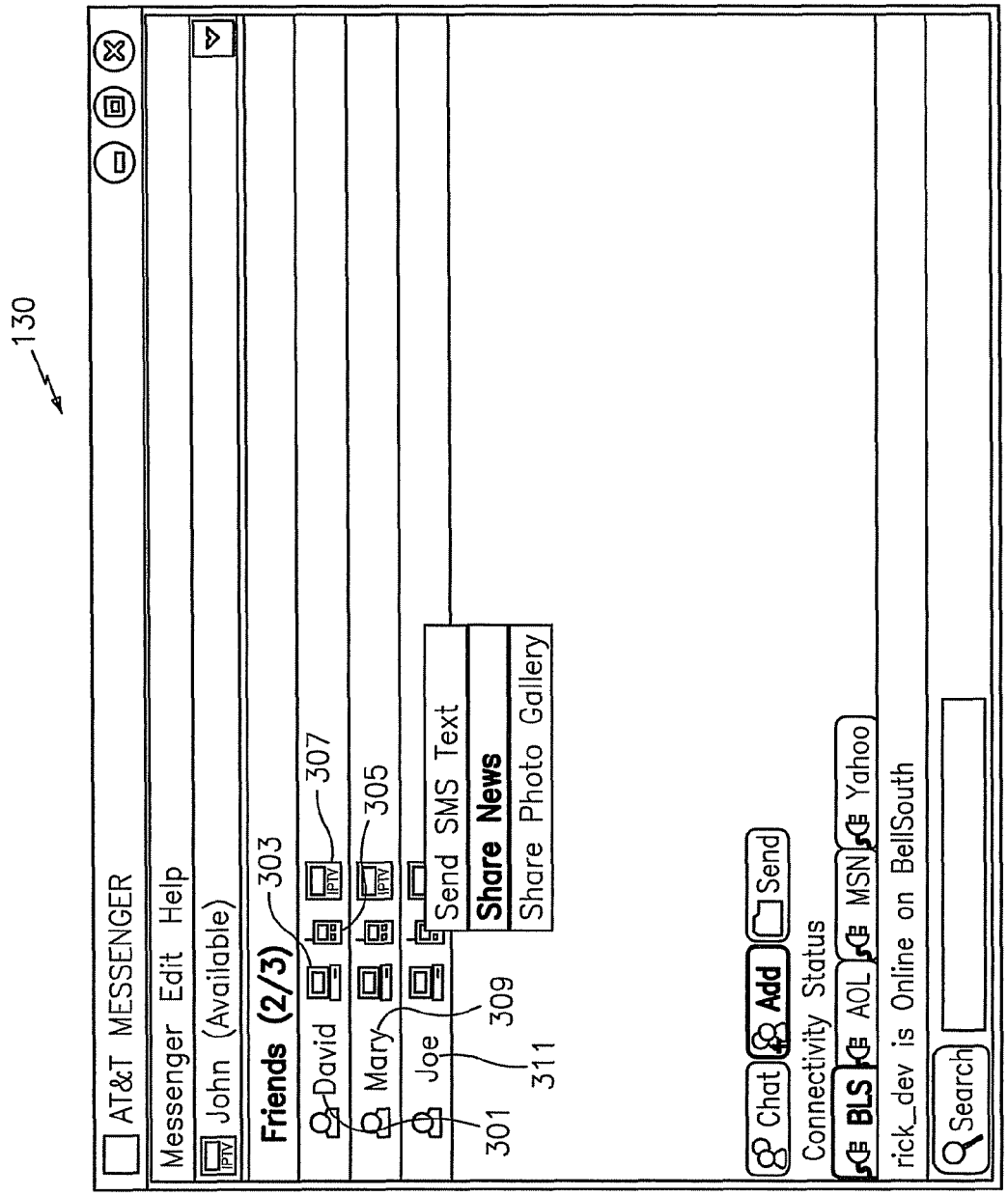
FIG. 3 illustrates a first exemplary graphical user interface for displaying multi-device instant messaging presence indications.

FIG. 3 illustrates an exemplary embodiment of graphical user interface 130 (FIG. 1) for displaying multi-device instant messaging presence indications on display device 115 of first device 102. Referring to FIG. 3, multi-device instant messaging indications are shown for a first user having an ID of David 301, a second user having an ID of Mary 309, and a third user having an ID of Joe 311. A first presence indicator 303 associated with David 301 may be shown in bold form, indicating that David is available for receiving instant messages on a first type of device. In the present example, the first type of device is an Internet-capable computing device, and thus the first presence indicator is intended to be representative of a personal computer.

A second presence indicator 305 associated with David 301 may be shown in shaded or dotted form, indicating that David is not available for receiving instant messages on a second type of device. In the present example, the second type of device is a wireless device, and thus the second presence indicator is intended to be representative of a cellular telephone or personal digital assistant (PDA). A third presence indicator 307 associated with David 301 may also be shown in shaded or dotted form, indicating that David is not available for receiving instant messages on a third type of device. In the present example, the third type of device is an Internet Protocol television (IPTV) capable device, and thus the third presence indicator is intended to be representative of an IPTV media presentation device. However, it is not required to use presence indicators which are visually representative of various types of devices. For example, a presence indicator could include a selectively illuminated indicator under a row or next to a column labeled with an appropriate word or phrase describing the type of device. Other types of presence indicators are also possible within the scope of the present disclosure, with the foregoing examples being provided solely for the sake of illustration.

If second device 104 is activated (i.e., powered on), presence server 139 retrieves presence information from converged presence database 141 for each of one or more IDs corresponding to contacts on the contact list associated with second ID 114. According to exemplary embodiments, the presence information is transmitted over wireless network 145, received by second device 104, and used by graphical user interface 149 to display presence indicators on display device 117 for each contact on the contact list associated with second ID 114.

Figure 4:
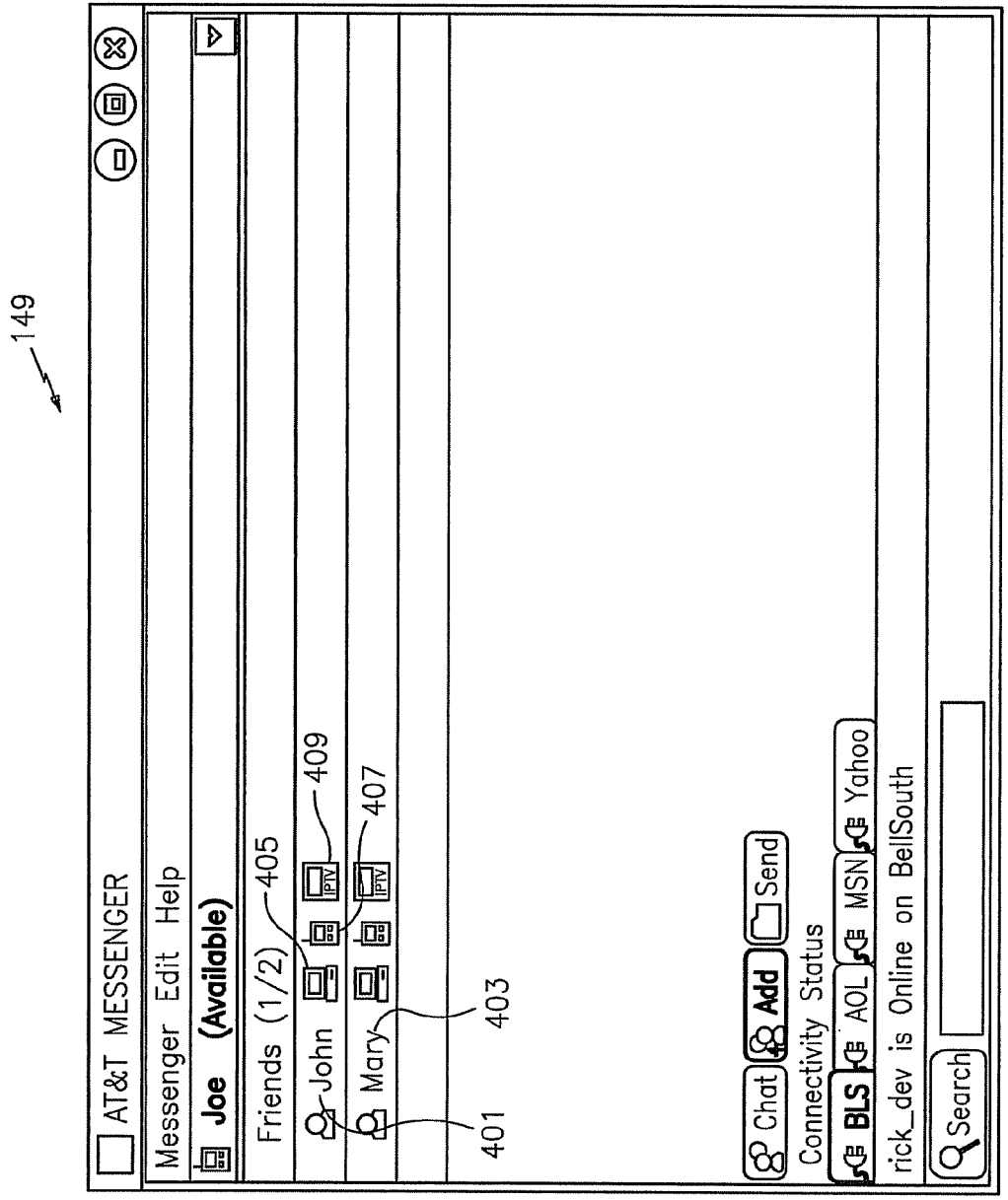
FIG. 4 illustrates a second exemplary graphical user interface for displaying multi-device instant messaging presence indications.

FIG. 4 illustrates an exemplary embodiment of graphical user interface 149 (FIG. 1) for displaying multi-device instant messaging presence indications on display device 117 of second device 104. Referring to FIG. 4, multi-device instant messaging indications are shown for a first user having an ID of John 401, and a second user having an ID of Mary 403. A first presence indicator 405 associated with John 401 may be shown in bold form, indicating that John is available for receiving instant messages on a first type of device. In the present example, the first type of device is an Internet-capable computing device, and thus the first presence indicator is intended to be representative of a personal computer.

A second presence indicator 407 associated with John 401 may be shown in shaded or dotted form, indicating that John is not available for receiving instant messages on a second type of device. In the present example, the second type of device is a wireless device, and thus the second presence indicator is intended to be representative of a cellular telephone or personal digital assistant (PDA). A third presence indicator 409 associated with John 401 may also be shown in shaded or dotted form, indicating that John is not available for receiving instant messages on a third type of device. In the present example, the third type of device is an Internet Protocol television (IPTV) capable device, and thus the third presence indicator is intended to be representative of an IPTV media presentation device. However, it is not required to use presence indicators which are visually representative of various types of devices. For example, a presence indicator could include a selectively illuminated indicator under a row or next to a column labeled with an appropriate word or phrase describing the type of device. Other types of presence indicators are also possible within the scope of the present disclosure, with the foregoing examples being provided solely for the sake of illustration.

The foregoing processes of downloading presence information from presence server 139 to first device 102 and second device 104 may occur periodically, repeatedly, at regular intervals, at one or more predetermined times, or in response to a user activating or deactivating a device, so as to permit display of up to date presence information for one or more other users on the first user's contact list and the second user's contact list, respectively.

According to exemplary embodiments, IMS 137 utilizes session initiation protocol (SIP) to implement communications with IP network 133, wireless network 145, or both. Optionally, one or both of processing mechanism 139 and processing mechanism 148 may be capable of executing SIP software. SIP defines a method of passing instant messages between endpoints. These instant messages may represent text, still images, videos, files, or various combinations thereof. More specifically, SIP is an application layer control (signaling) protocol for creating, modifying, and terminating sessions with one or more participants, such as first device 102 communicating over IP network 133 and second device 104 communicating over wireless network 145. These sessions may include any of instant messaging, Internet telephone calls, IPTV, multimedia distribution, and multimedia conferences. SIP is text-based, allowing for humans to read SIP messages. SIP clients may use user datagram protocol (UDP) or transmission control protocol (TCP) to connect to SIP servers and other SIP endpoints.

According to exemplary embodiments, SIP works in concert with several other protocols and is only involved in the signalling portion of a communication session. SIP acts as a carrier for the Session Description Protocol (SDP), which describes the media content of the session including which IP ports and codec to use. In accordance with embodiments, SIP "sessions" are simply packet streams of the Real-time Transport Protocol (RTP). RTP is the carrier for the actual voice, text, video or image content of an instant message. Further information about SIP is found in the RFC 3261 specification released by the Internet Engineering Task Force (IETF) SIP Working Group, the entire contents of this specification being incorporated herein by reference.

One standard instant messaging protocol based on SIP, called Session Initiation Protocol for Instant Messaging and Presence Leveraging Extensions (SIMPLE), may be used to carry presence information, thereby conveying a person's willingness and ability to engage in instant messaging. Some portions of SIMPLE have been standardized as RFC 3428, with several implementations currently available, such as Microsoft's Windows Messenger™. Another standard instant messaging protocol is Extensible Messaging and Presence Protocol (XMPP). XMPP is an open, extensible markup language (XML)-based protocol for implementing near-real-time, extensible IM and presence information in the form of buddy lists. For example, XMPP is the core protocol for Jabber™ Instant Messaging and Presence™ technology.

IMS 137 is capable of implementing several proxies, collectively called CSCF (Call Session Control Function), for processing SIP signalling packets. A P-CSCF (Proxy-CSCF) is a SIP proxy that is the first point of contact for a terminal device such as first device 102 or second device 104. An S-CSCF (Serving-CSCF) is the central node of the signalling plane. This central node is a SIP server, but performs session control as well. The central node handles SIP registrations, which allows it to bind the user location (e.g. the IP address of the terminal device) and the SIP address, and provides routing services. An I-CSCF (Interrogating-CSCF) is another SIP function located at the edge of an administrative domain. An IP address for the I-CSCF is published in the domain name system (DNS) of the domain, so that remote servers can find this address and use it as a forwarding point (e.g. registering) for SIP packets to this domain.

Figure 2:
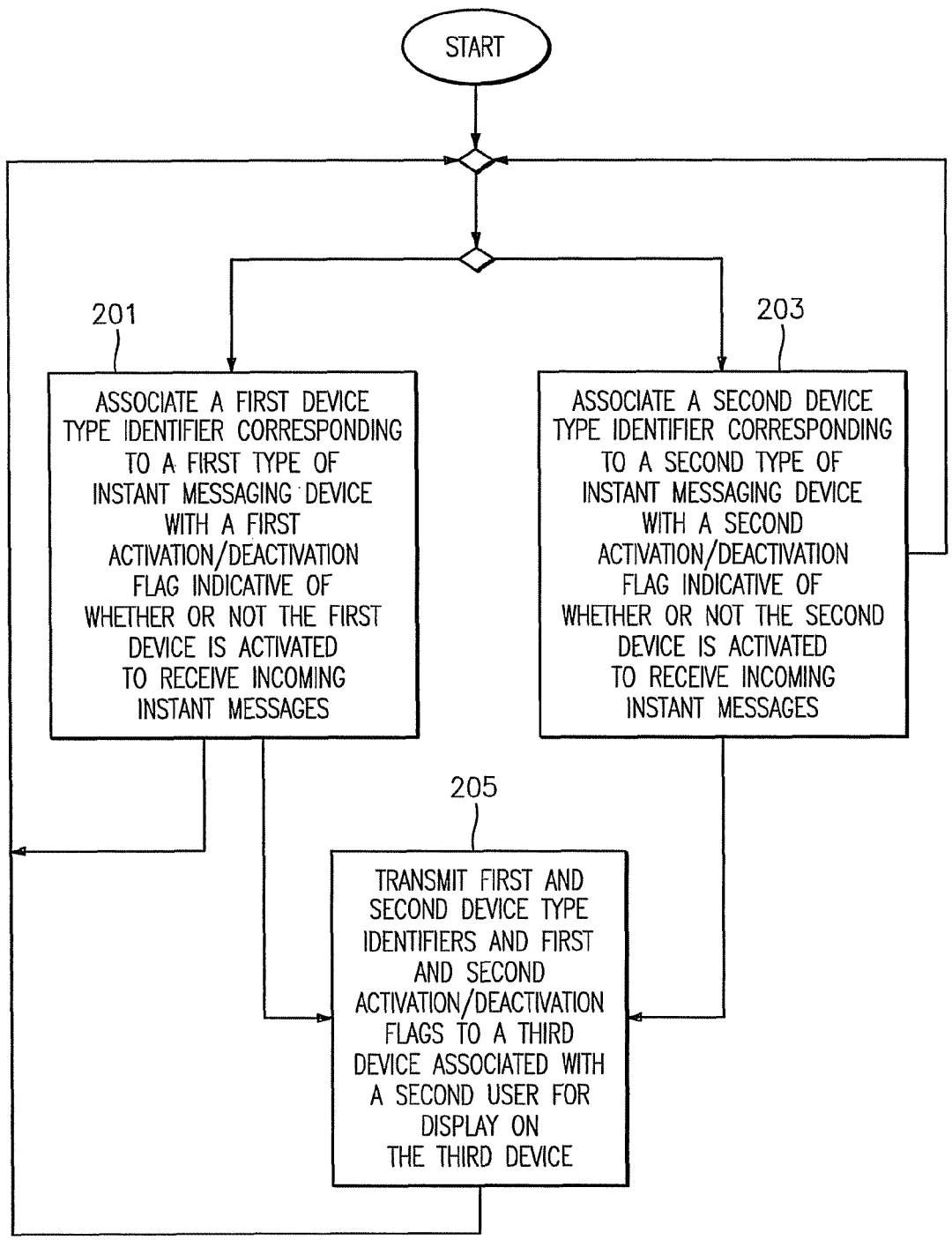
FIG. 2 is a flowchart of an exemplary procedure for providing multi-device instant messaging (IM) presence indications.

FIG. 2 is a flowchart of an exemplary procedure for providing multi-device instant messaging (IM) presence indications. Presence information is acquired for each of a plurality of devices associated with a first user, wherein the plurality of devices include a first device representing a first type of instant messaging device and second device representing a second type of instant messaging device different from the first type of instant messaging device. For example, presence information for a plurality of devices used by the first user may be acquired periodically, repeatedly, at regular intervals, at one or more predetermined times, or by monitoring an activation or a deactivation for any of the plurality of devices, or in response to detecting the activation or deactivation of any of the plurality of devices, with only the most recent or current presence information for each of the devices being stored in converged presence database 141 (FIG. 1). With reference to FIG. 2, presence information is acquired for the first and second devices by associating a first device type identifier corresponding to the first type of instant messaging device with a first activation/deactivation flag indicative of whether or not the first device is activated to receive incoming instant messages (block 201), and by associating a second device type identifier corresponding to the second type of instant messaging device with a second activation/deactivation flag indicative of whether or not the second device is activated to receive instant messages (block 203). Next, at block 205, the first and second device type identifiers and first and second activation/deactivation flags are transmitted to a third device associated with a second user for display on the third device.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for displaying an instant messaging (IM) presence indicator for each of a plurality of devices associated with a first user, wherein the plurality of devices include a first device representing a first type of instant messaging device and a second device representing a second type of instant messaging device different from the first type of instant messaging device, the method comprising:

acquiring presence information for the first and second devices;

associating a first device type identifier corresponding to the first type of instant messaging device with a first activation/deactivation flag indicative of whether or not the first device is activated to receive incoming instant messages based upon the presence information for the first device;

associating a second device type identifier corresponding to the second type of instant messaging device with a second activation/deactivation flag indicative of whether or not the second device is activated to receive instant messages based upon the presence information for the second device; and transmitting the first and second device type identifiers and first and second activation/deactivation flags to a third device associated with a second user for display on the third device;

wherein the first device type identifier indicates a first platform on which the first device is capable of communicating, and the second device type identifier indicates a second platform on which the second device is capable of communicating.

2. The method of claim 1 wherein acquiring presence information comprises at least one of acquiring the presence information periodically, repeatedly, at regular intervals, or at one or more predetermined times.

3. The method of claim 1 wherein acquiring presence information comprises acquiring the presence information in response to detecting activation or deactivation of at least one of the first device or the second device.

4. The method of claim 1 wherein a list of contacts is received for the second user, the list of contacts comprising a plurality of user identifiers (IDs) including at least a first ID for identifying the first user.

5. The method of claim 4 further comprising acquiring presence information for each of a plurality of users having user IDs included in the list of contacts.

6. The method of claim 1 wherein the first platform is a wireless network and the second platform is an Internet protocol (IP) network.

7. A non-transitory computer readable storage medium for displaying an instant messaging (IM) presence indicator for each of a plurality of devices associated with a first user, the plurality of devices including at least a first device representing a first type of instant messaging device and a second device representing a second type of instant messaging device different from the first type of instant messaging device, the non-transitory computer readable storage medium storing instructions for execution by the processing circuit for executing a method comprising:

acquiring presence information for the first and second devices;

associating a first device type identifier corresponding to the first type of instant messaging device with a first activation/deactivation flag indicative of whether or not the first device is activated to receive incoming instant messages based upon the presence information for the first device;

associating a second device type identifier corresponding to the second type of instant messaging device with a second activation/deactivation flag indicative of whether or not the second device is activated to receive instant messages based upon the presence information for the second device; and transmitting the first and second device type identifiers and first and second activation/deactivation flags to a third device associated with a second user for display on the third device;

wherein the first device type identifier indicates a first platform on which the first device is capable of communicating, and the second device type identifier indicates a second platform on which the second device is capable of communicating.

8. The non-transitory computer readable storage medium of claim 7 wherein acquiring presence information comprises at least one of acquiring the presence information periodically, repeatedly, at regular intervals, or at one or more predetermined times.

9. The non-transitory computer readable storage medium of claim 7 wherein acquiring presence information comprises acquiring the presence information in response to detecting activation or deactivation of at least one of the first device or the second device.

10. The non-transitory computer readable storage medium of claim 7 wherein a list of contacts is received for the second user, the list of contacts comprising a plurality of user identifiers (IDs) including at least a first ID for identifying the first user.

11. The non-transitory computer readable storage medium of claim 10 further comprising acquiring presence information for each of a plurality of users having user IDs included in the list of contacts.

12. The non-transitory computer readable storage medium of claim 7 wherein the first platform is a wireless network and the second platform is an internet protocol (IP) network.

13. An apparatus for displaying an instant messaging (IM) presence indicator for each of a plurality of devices associated with a first user, wherein the plurality of devices include a first device representing a first type of instant messaging device and second device representing a second type of instant messaging device different from the first type of instant messaging device, the apparatus including:

a processing mechanism for acquiring presence information for the first and second devices, for associating a first device type identifier corresponding to the first type of instant messaging device with a first activation/deactivation flag indicative of whether or not the first device is activated to receive incoming instant messages based upon the presence information for the first device, and for associating a second device type identifier corresponding to the second type of instant messaging device with a second activation/deactivation flag indicative of whether or not the second device is activated to receive instant messages based upon the presence information for the second device;

a storage mechanism, operatively coupled to the processing mechanism, for storing at least a most recently acquired portion of the acquired presence information; and a communications mechanism for transmitting the first and second device type identifiers and first and second activation/deactivation flags to a third device associated with a second user for display on the third device;

wherein the first device type identifier indicates a first platform on which the first device is capable of communicating, and the second device type identifier indicates a second platform on which the second device is capable of communicating.

14. The apparatus of claim 13 wherein acquiring presence information comprises at least one of acquiring the presence information periodically, repeatedly, at regular intervals, or at one or more predetermined times.

15. The apparatus of claim 13 wherein acquiring presence information comprises acquiring the presence information in response to detecting activation or deactivation of at least one of the first device or the second device.

16. The apparatus of claim 13 wherein a list of contacts is received for the second user, the list of contacts comprising a plurality of user identifiers (IDs) including at least a first ID for identifying the first user.

17. The apparatus of claim 16 wherein the processing mechanism is capable of acquiring presence information for each of a plurality of users having user IDs included in the list of contacts.

* * * * *